(12) United States Patent
Page et al.

(10) Patent No.: US 7,052,768 B2
(45) Date of Patent: May 30, 2006

(54) SOLID INSULATOR AND METHOD FOR MANUFACTURING A SOLID INSULATOR

(75) Inventors: Stéphane Page, Dübendorf (CH); Guido Meier, Würenlingen (CH); Stefan Förster, Opfikon (CH)

(73) Assignee: ABB Research LTD, Zurich (CH)

( * ) Notice: Subject to any disclaimer, the term of this patent is extended or adjusted under 35 U.S.C. 154(b) by 49 days.

(21) Appl. No.: 10/630,661

(22) Filed: Jul. 31, 2003

(65) Prior Publication Data
US 2004/0020685 A1 Feb. 5, 2004

(30) Foreign Application Priority Data
Aug. 2, 2002 (EP) .................................. 02405675

(51) Int. Cl.
*B32B 27/38* (2006.01)
(52) U.S. Cl. ...................... 428/413; 174/68; 174/70 R; 174/174; 174/137 R; 442/239; 442/253
(58) Field of Classification Search ................. 428/413; 174/68, 70 R, 174, 137 R; 442/239, 253
See application file for complete search history.

(56) References Cited

U.S. PATENT DOCUMENTS 3,988,645 A * 10/1976 Luxa et al. .................. 361/120
5,753,864 A * 5/1998 Schulz et al. ............... 174/167
6,333,462 B1 * 12/2001 Quaggia .................... 174/74 R

FOREIGN PATENT DOCUMENTS

| CH | 690256 A5 | 6/2000 |
| DE | 3220529 A1 | 11/1983 |
| EP | 0588359 A2 | 3/1994 |
| GB | 914552 | 1/1963 |

* cited by examiner

Primary Examiner—Philip C. Tucker
(74) Attorney, Agent, or Firm—Buchanan Ingersoll PC

(57) ABSTRACT

Solid insulator for gas-insulated encapsulated high voltage installations with an insulator body, which is supporting at least one central conductor that is provided for carrying high voltage and that is arranged in an outer enclosure. The insulator body comprises a fiber-reinforced polymer.

16 Claims, 6 Drawing Sheets

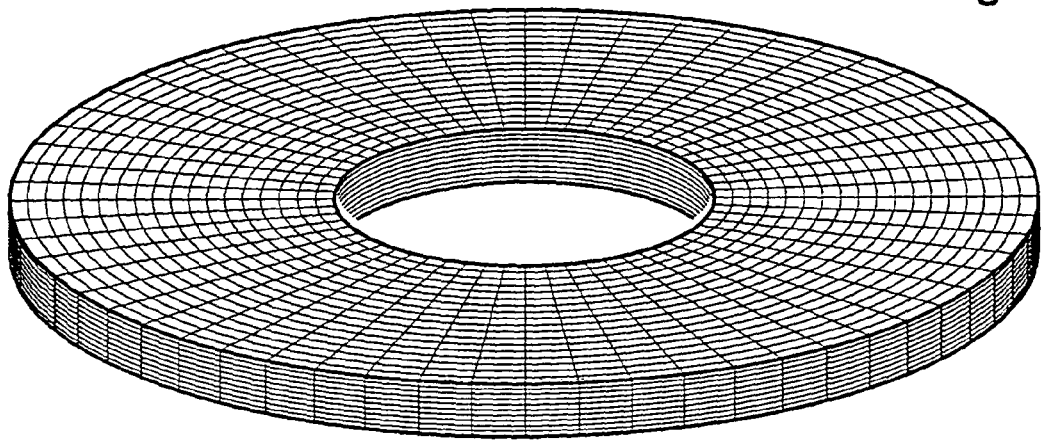
Fig. 11
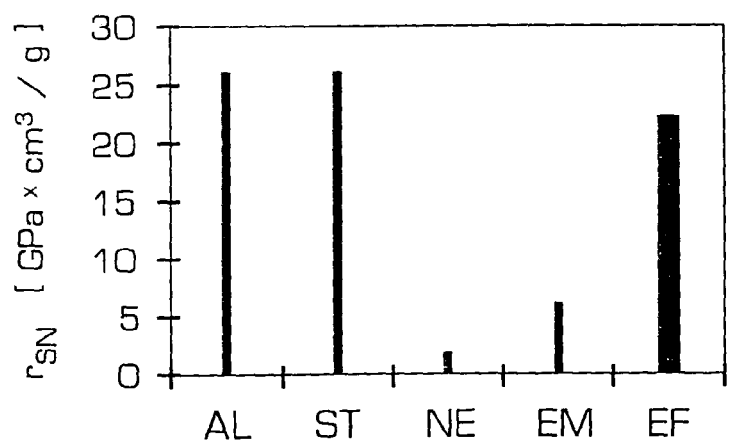
Fig. 12
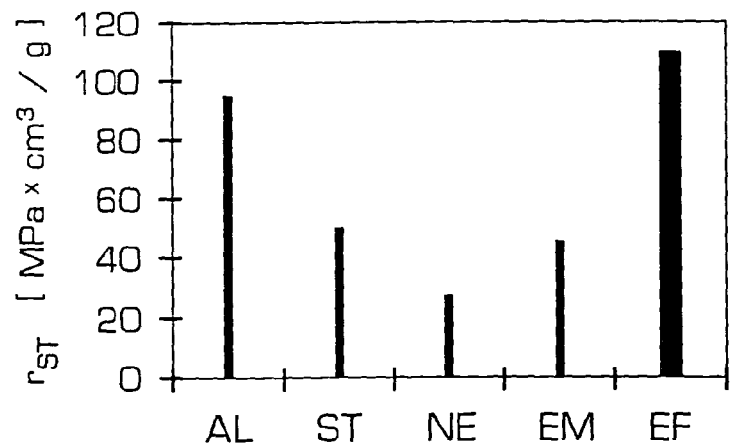

SOLID INSULATOR AND METHOD FOR MANUFACTURING A SOLID INSULATOR

FIELD OF THE INVENTION

The invention relates to a solid insulator in accordance with the preamble of the first claim.

It likewise relates to a method for manufacturing a solid insulator in accordance with the preamble of the independent method claim.

BACKGROUND OF THE INVENTION

In pressurized gas-insulated switchgear stations, the solid insulation components are disc-like in shape with some complex sub-structural features including central metallic inserts.

DE 33 11 218 A1 discloses a disc-type insulator for enclosed high-voltage equipment. The insulator includes a cast-in electrode which is segmented and which extends peripherally and concentrically with respect to the edge surface of the disc. The cast-in electrode is connected to contact electrodes by means of contact tongues; the contact electrodes bearing against a metal mounting ring. To avoid damage to the disc-type insulator, to the contact tongues, or to the cast-in electrode during shrinkage of the disc-type insulator, following its casting, or damage resulting from thermal stresses during operation, the cast-in electrode is divided into a plurality of electrode segments which follow one another in the peripheral direction.

DE 40 15 929 A1 discloses a solid insulator, which is intended for a gas-insulated metal-encapsulated high-voltage installation. It has an insulator body containing a cast resin, an electrode, which is supported by the insulator body and is provided for carrying high voltage, a retaining part which can be mounted on the metal encapsulation and a field control element, which is cast onto the insulator body and consists of electrically conductive plastic. The insulator is intended to reliably prevent mechanical damage to the insulator body and/or irreversible damage caused by long-term dielectric stresses.

Such disk-like insulation components consist of a vacuum-cast, mineral-filled (i.e. $SiO_2$, $Al_2O_3$ or $CaSiO_3$), anhydride-cured Bisphenol-A epoxy, sustaining the current mechanical and electrical loads. In gas insulated switchgear substations, solid insulation components are submitted to both high electrical field and high mechanical loads, such as hydrostatic pressures and bending moments.

The main drawbacks of mineral-particle-filled epoxy gas insulated switchgear insulators are the heavy weight of such components (e.g. two to three people are required to handle the biggest insulators, i.e. more than 30 kg), the limited mechanical performance and relative brittleness of the material, leading to catastrophic failure mechanisms.

SUMMARY OF THE INVENTION

Accordingly, one object of the invention is to provide a solid insulator, which is lightweight and has a high mechanical performance.

According to the invention, this is achieved by the features of the first claim.

The advantages of the invention can be seen, inter alia, in the fact that weight can be saved up to 70% compared to conventional mineral-particle-filled epoxy materials, which allows an easier handling and cheaper maintenance, requiring fewer personnel. A further advantage is the much better mechanical (i.e. stiffness and strength) performance, which can lead to thinner structures and hence allow more compact gas insulated switchgear substation designs. It also can lead to higher flexibility in the solid insulator design, allowing more simple design geometry, such as a flat-disc shape, which is certainly the best possible dielectric design for gas insulated switchgear solid insulators. Further the fields of application will be larger, since the new materials can meet the requirements of some specific local regulations for very high burst-pressure solid insulators, as well as for the latent $SF_6$-free insulation technology, for which much higher operating pressures will be required. No catastrophic failure mechanism applies, meaning a higher reliability and safety. The thinner insulator design allowed by the new solid insulator technology will avoid the fastidious and thus expensive integration of complex field grading electrodes as described in DE 33 11 218 A1 and DE 40 15 929 A1 in most cases. In cases where field grading electrodes are really required, the easy and simple integration of conductive fibers, such as carbon fibers, is however possible.

The use of fiber-reinforced epoxy materials will lead to an overall cost reduction in gas insulated switchgear solid insulators by bringing higher mechanical performances linked with a higher reliability.

Further advantageous embodiments of the invention emerge from the subclaims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 11 shows a flat-disc-shape geometry of a fiber-reinforced epoxy gas insulated switchgear solid insulator with a radial and hoop fiber orientation;

FIG. 12 shows the stiffness-to-weight $r_{SN}$ and the strength-to-weight ratios $r_{ST}$ of glass-fiber reinforced epoxy resins EF compared to aluminum AL, steel ST, neat epoxy NE, and mineral-particle-filled epoxy materials EM.

Only those elements that are essential for an understanding of the invention are shown.

DETAILED DESCRIPTION OF THE INVENTION

Fiber-reinforced polymers are an unique class of materials, which are composed of a polymeric matrix material reinforced with organic or inorganic fibers. The reinforcing fibers are the primary load carriers, with the matrix component transferring the load from fiber to fiber. In the present description, the polymeric matrix consists of a typical anhydride-cured epoxy resin commonly used in electrical insulation, while the nature of the reinforcing fibers can be of various types, as long as it involves good electrical insulation properties. Glass fibers in general, with a preference for the E-CR glass fiber type, are certainly the most suited fibers for the present solid electrical insulation application. However, other inorganic fibers, such as basalt and quartz fibers, and organic fibers, such as liquid crystal polymer, aromatic polyamide and poly(p-phenylene-2,6-benzobisoxazole) fibers can also be used. Additionally, reinforcement of the polymeric matrix may be achieved in a variety of ways. Fibers may be either continuous, in the form of woven or knitted fabrics or three-dimensional preforms, or discontinuous, in the form of mats. Fiber-reinforced epoxy materials offer some significant advantages over the conventional vacuum-cast mineral-particle-filled epoxy materials. The strength-to-weight and stiffness-to-weight ratios are the primary reasons fiber-reinforced polymers are used. Additionally, the fracture toughness of glass-fiber-reinforced epoxy materials is much better than mineral-particle-filled epoxy materials. Consequently, glass-fiber reinforced epoxy materials greatly alter the catastrophic failure mechanisms involved in mineral-particle-filled epoxy materials. Only inter-laminar failure or delamination between fibers and the epoxy matrix may occur. Furthermore, the fracture toughness of fiber reinforced polymeric materials can be maximized by an appropriate fiber orientation.

Solid insulation components in pressurized $SF_6$-gas insulated switchgear stations are basically circular bulkheads between two pressurized chambers. Such gas insulated switchgear stations are described in DE 33 11 218 A1 and DE 40 15 929 A1, which are enclosed herewith. The main load that these solid insulators are intended to experience is a typical isostatic-pressure load type. There is basically no preferred in-plane load direction. Quasi-isotropic properties, i.e. in-plane properties identical in all directions, are therefore required in such a load case. Quasi-isotropic laminate properties can be achieved using mainly three different fiber fabric architectures, namely radial and hoop fiber orientation, biaxial fiber orientation with layer rotation and unidirectional (UD) fiber orientation with layer rotation. These different fiber fabric architectures can also be mixed.

Figure 1:
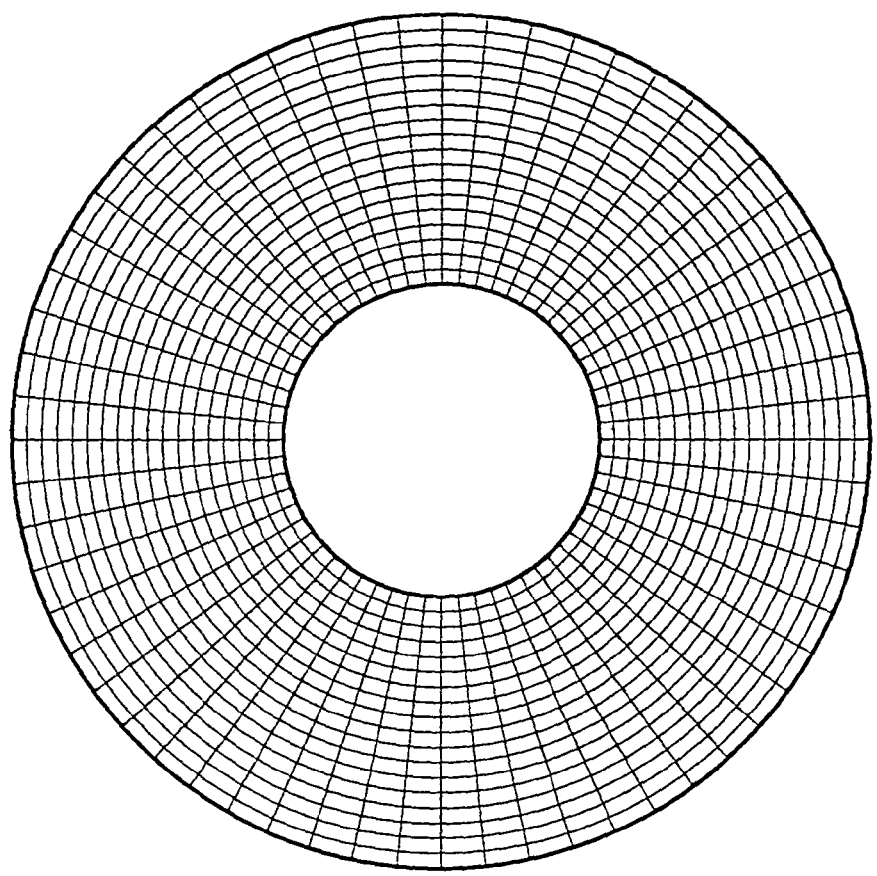
FIG. 1 shows a radial and hoop orientation fiber fabric type.
Figure 2:
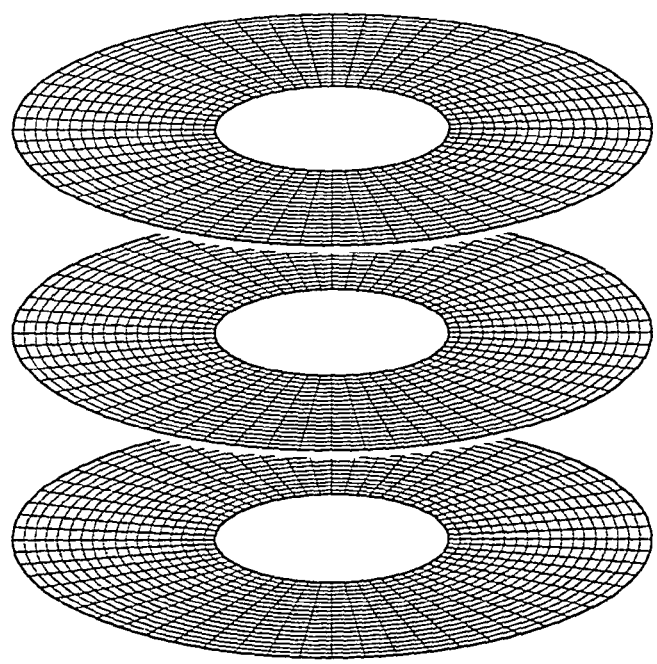
FIG. 2 shows a typical laminate layer stacking sequence using the radial and hoop orientation fiber fabric type from FIG. 1.

Radial and Hoop Fiber Orientation:

The radial and hoop fiber orientation, as shown in FIG. 1, is the best fiber orientation alternative, since the quasi-isotropic property requirement is by definition already achieved with this fiber orientation type. Different layers of such a fiber fabric can then be simply stacked to form the fiber backbone of the insulator, as shown in FIG. 2.

Figure 3:
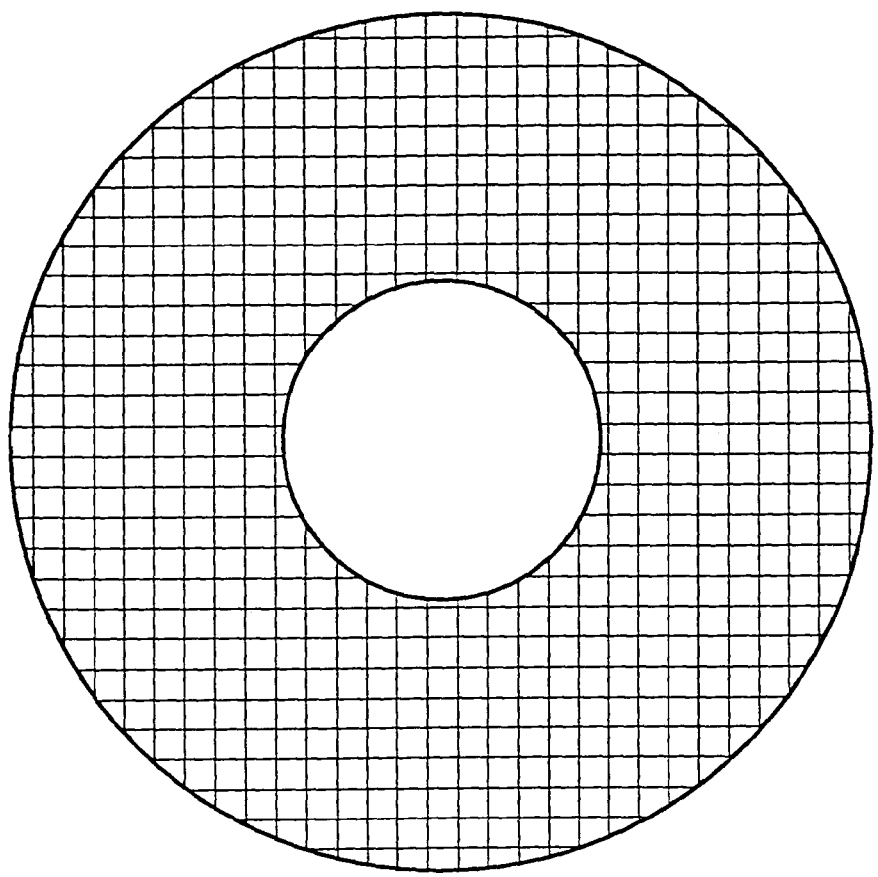
FIG. 3 shows a biaxial orientation fiber fabric type.
Figure 4:
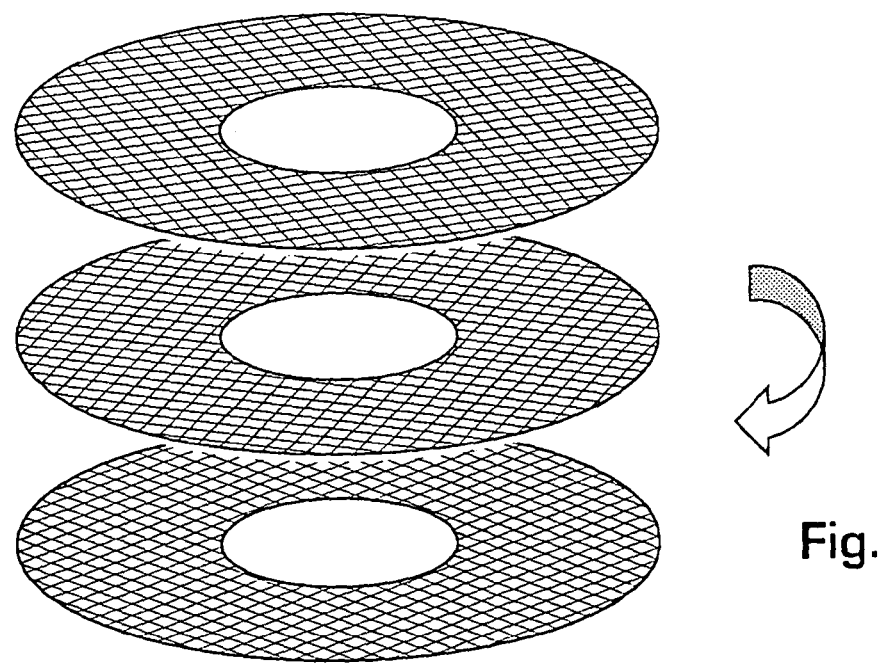
FIG. 4 shows a typical laminate layer stacking sequence using biaxial orientation fiber fabric types from FIG. 3.

Biaxial Fiber Orientation with Layer Rotation:

Quasi-isotropic laminate properties can also be achieved using biaxial orientation fiber fabric types, such as two dimensional woven fabrics, as shown in FIG. 3, provided each stacked fabric layer is rotated by a given degree (the lower, the more quasi-isotropic) compared to the previous one, as shown in FIG. 4. A 360° total rotation should ideally be achieved in the layer stacking sequence.

Figure 5:
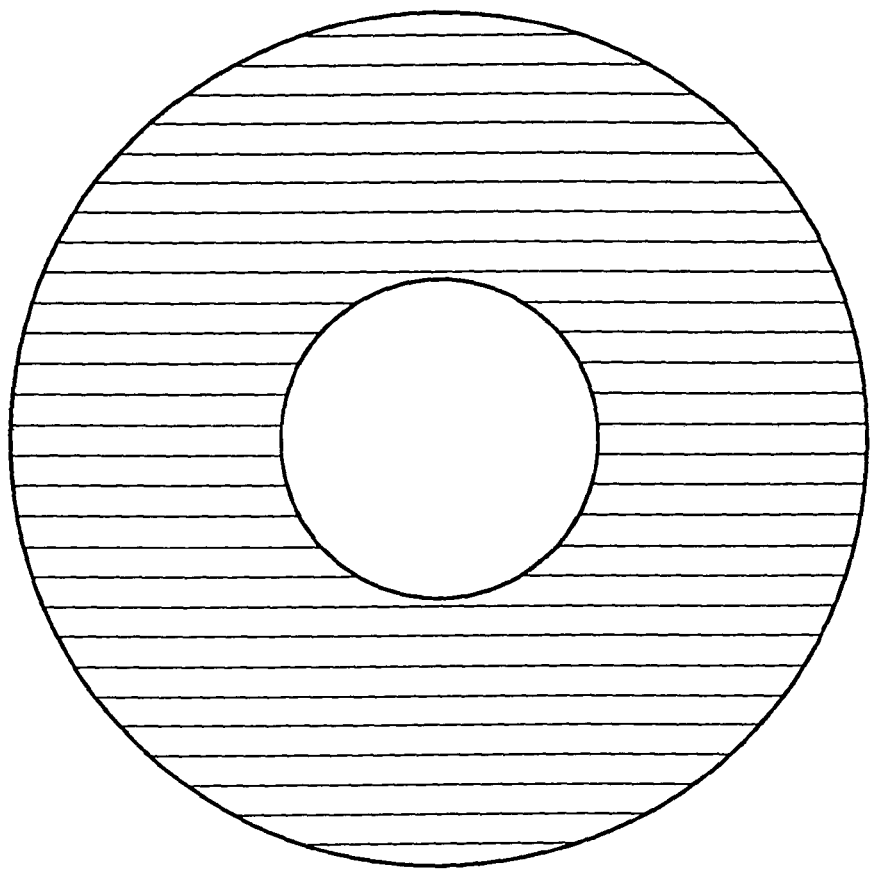
FIG. 5 shows an unidirectional orientation fiber fabric type.
Figure 6:
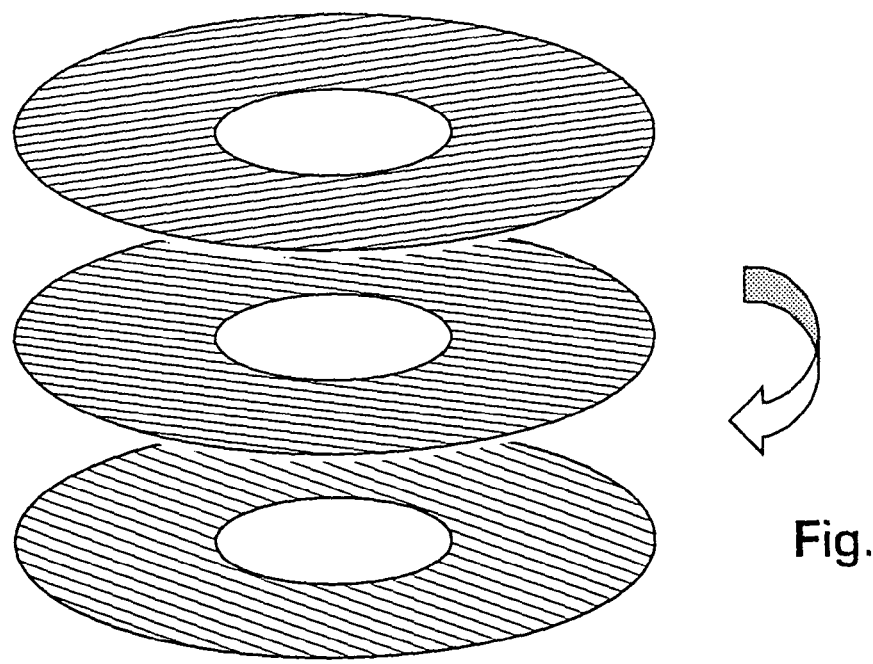
FIG. 6 shows a typical laminate layer stacking sequence using the unidirectional orientation fiber fabric type from FIG. 5.

Unidirectional (UD) Fiber Orientation with Layer Rotation:

A similar approach as with rotated biaxial fiber fabrics can be used with unidirectional (UD) fiber fabrics, as shown in FIG. 5, instead. Quasi-isotropic laminate properties are also achieved by rotating the different UD fabric layers, as shown in FIG. 6. Again, the lower the rotating angle, the more quasi-isotropic the properties. A 360° total rotation should here also ideally be achieved in the layer stacking sequence.

Figure 7:
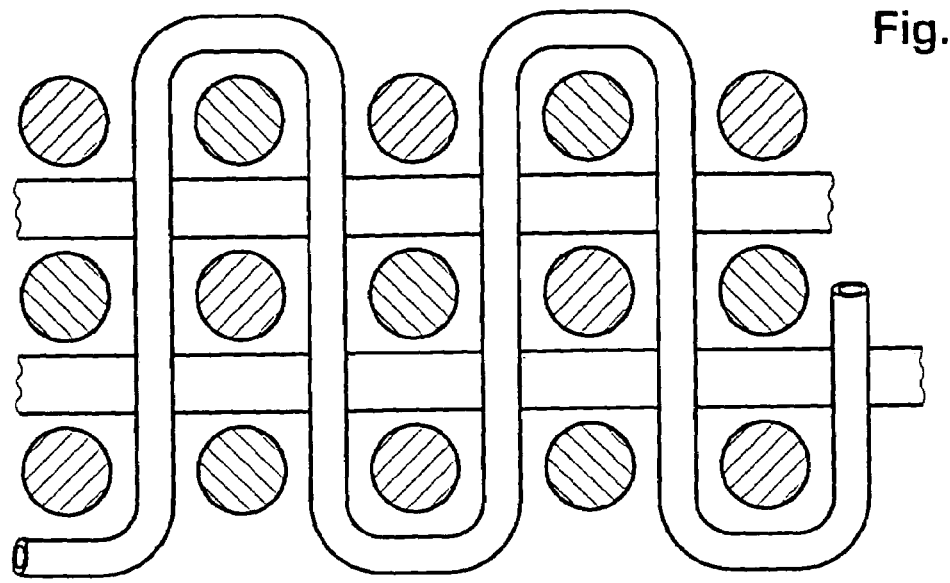
FIG. 7 shows a three-dimensional orthogonal fiber weaving architecture.
Figure 8:
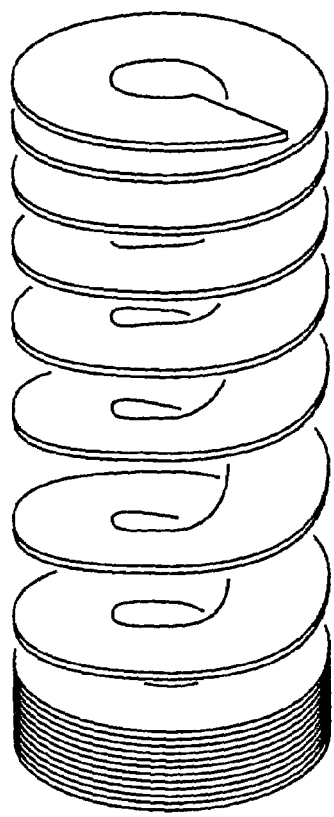
FIG. 8 shows a continuous spiral-like preform for radial and hoop fiber orientation.

Fiber Reinforcement Backbone Preforming:

The two-dimensional or UD fiber structures mentioned above are assembled in a preform. A preform is a single piece of reinforcement pre-tailored to the shape of the part to be manufactured. In the present description, disc-like shape preforms are used. The biaxial woven or UD fabrics are cut. This operation is not necessary for the radial and hoop orientation fabrics, since they are already weaved in a disc-like shape. The layers are then physically bonded, i.e. stitched, or chemically bonded, i.e. using resin powders, to provide the final shape. The use of fiber preforms lead to significant manufacturing time reductions and quality improvements, since the fastidious laminating operation is avoided. Three dimensional woven fiber structures, as shown in FIG. 7, can also be used as preforms. Instead of a stitching or bonding operation, a third weave dimension is added. As a result, three dimensional fiber structures have the further advantage of dramatically mitigate inter-laminar failures, which represent the most critical failure mechanism in fiber-reinforced polymer materials. In the radial and hoop fiber orientation case, continuous spiral-like preforms, as shown in FIG. 8, are also alternative solutions to stitched or bonded two dimensional woven fabric preforms.

Figure 9:
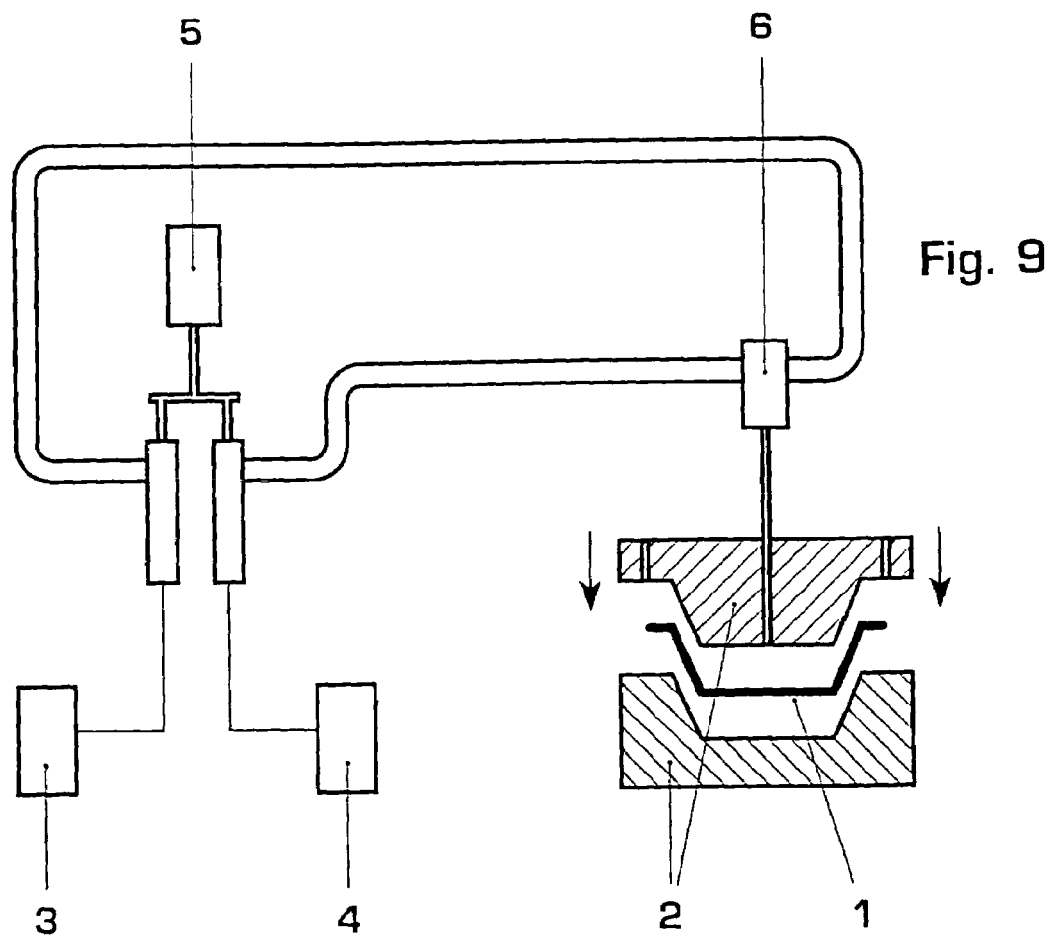
FIG. 9 shows the equipment needed for the Resin Transfer Molding (RTM) technology.
Figure 10:
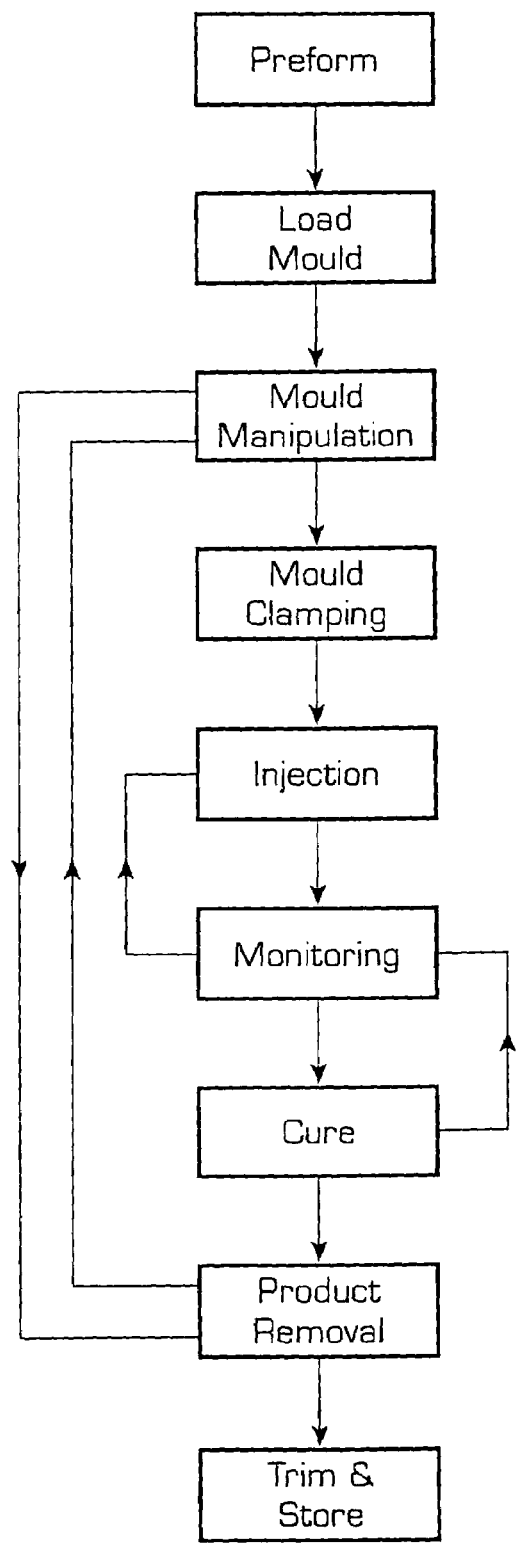
FIG. 10 shows the process for the Resin Transfer Molding (RTM) technology.

Manufacturing Process:

The fiber-reinforced epoxy glas insulated switchgear insulators are manufactured using the Resin Transfer Molding (RTM) processing technology. RTM-type infusion processes, as shown in FIGS. 9 and 10, are multiple stage processes, which involve the placement of a fiber preform 1 into a matched mold tool 2 and the closing of the mold followed by the injection of a sufficient quantity of an epoxy system at low pressure, typically 1–4 bar, into the closed mold cavity thus permeating the fiber pack of the perform 1. As shown in FIG. 9, an epoxy resin stored in a vessel 3 and an anhydride-based hardener or catalyst stored in a vessel 4 by means of a metering pump 5 are transported to a mixing device 6 in which resin and hardener are mixed prior to the injection of the resulting epoxy system into the mold. Once the epoxy system has cured, the mold 2 is opened and the part is removed. RTM-type infusion processes are best known for their abilities to provide an excellent surface finish, a near-net-shape part which requires little finishing, and composite properties often comparable to vacuum bagged or autoclaved composites, i.e. with very low void content. Additionally, polymeric gel coats can be applied in RTM technology in order to further improve the surface aspect quality of the final part, which can be of very high importance in electrical applications. Furthermore, a low-permittivity gel coat can also be tailored in order to reduce the particle sensitivity of the insulator surface in an aggressive gaseous environment. The RTM-type processes fall into categories, which involve pushing the resin into the cavity with external pressure (RTM-type) and those, which pull the resin in by vacuum process (VARTM-type). Pending on the solid insulator type, vacuum can be applied instead of or in combination with external pressure in order to insure a very low/near zero void content within the part, which is an absolute prerequisite in high-voltage insulation applications.

FIG. 11 shows a flat-disc-shape geometry of a fiber-reinforced epoxy gas insulated switchgear solid insulator with a radial and hoop fiber orientation after processing. A preform consisting of different stacked layers with radial and hoop fiber orientation, as shown in FIGS. 1 and 2, is used.

FIG. 12 shows the strength-to-weight and stiffness-to-weight ratios of different materials. These two ratios are clearly much better for epoxy resins reinforced with glass fibers than for epoxy resins filled with mineral particles.

The invention is of course not restricted to the exemplary embodiment shown and described.

Obviously, numerous modifications and variations of the present invention are possible in light of the above teachings. It is therefore to be understood that within the scope of the appended claims, the invention may be practiced otherwise than as specifically described herein.

The invention claimed is:

1. Solid insulator within a gas-insulated encapsulated high voltage installation, the solid insulator with a disc-shaped insulator body supporting at least one conductor that is provided for carrying high voltage, and that is arranged within an outer enclosure of the gas-insulated encapsulated high voltage installation, wherein said insulator body comprises a fiber-reinforced polymer, the orientation of the fibers of the insulator body is in the disc-plane and the orientation varies from layer to layer or within a layer, such that the disc-plane has quasi-isotropic mechanical properties.

2. Solid insulator as claimed in claim 1, wherein said insulator body comprises a fiber-reinforced epoxy material.

3. Solid insulator as claimed in claim 1,
   wherein said insulator body comprises non-conductive organic fibers and/or non-conductive inorganic fibers.

4. Solid insulator as claimed in claim 1,
   wherein said insulator body comprises conductive fibers for field grading purposes.

5. Solid insulator within a gas-insulated encapsulated high voltage installation, the solid insulator with an insulator body supporting at least one conductor that is provided for carrying high voltage, and that is arranged within an outer enclosure of the installation, wherein the insulator body comprises a fiber-reinforced polymer, the orientation of the fibers in the insulator body is in radial and hoop directions and the fiber fabrics are arranged in different layers such that the insulator body has quasi-isotropic mechanical properties.

6. Solid insulator within a gas-insulated encapsulated high voltage installation, the solid insulator with an insulator body supporting at least one conductor that is provided for carrying high voltage, and that is arranged within an outer enclosure of the installation, wherein the insulator body comprises a fiber-reinforced polymer, the orientation of the fibers in the insulator body is biaxial and the fiber fabrics are arranged in different layers with the stacked layers rotated by a given degree such that the insulator body has quasi-isotropic mechanical properties.

7. Solid insulator within a gas-insulated encapsulated high voltage installation, the solid insulator with an insulator body supporting at least one conductor that is provided for carrying high voltage, and that is arranged within an outer enclosure of the installation, wherein the insulator body comprises a fiber-reinforced polymer, the orientation of the fibers in the insulator body is unidirectional and the fiber fabrics are arranged in different layers with the stacked layers rotated by a given degree such that the insulator body has quasi-isotropic mechanical properties.

8. Solid insulator as claimed in claim 1,
   wherein a fiber backbone of the insulator body comprises a preform with stacked layers of radial and hoop, biaxial or unidirectional fibers, where the layers are physically or chemically bonded.

9. Solid insulator within a gas-insulated encapsulated high voltage installation, the solid insulator with an insulator body supporting at least one conductor that is provided for carrying high voltage, and that is arranged within an outer enclosure of the gas-insulated encapsulated high voltage installation, wherein the insulator body comprises a fiber-reinforced polymer, a fiber backbone of the insulator body comprises a preform including a continuous radial and hoop spiral-like fiber layer, the orientation of the fibers in the insulator body is such that the insulator body has quasi-isotropic mechanical properties.

10. Solid insulator as claimed in claim 1,
    wherein a fiber backbone in the insulator body comprises a preform, which comprises a three-dimensional woven fiber structure.

11. Solid insulator as claimed in claim 6, wherein the rotation of the layer stacking sequence is in total 360°.

12. Solid insulator as claimed in claim 7, wherein the rotation of the layer stacking sequence is in total 360°.

13. Solid insulator as claimed in claim 5, wherein the insulator body is of a disc shape.

14. Solid insulator as claimed in claim 6, wherein the insulator body has a disc shape.

15. Solid insulator as claimed in claim 7, wherein the insulator body has a disc shape.

16. Solid insulator as claimed in claim 9, wherein the insulator body has a disc shape.

* * * * *